United States Patent
Park et al.

(10) Patent No.: US 8,755,434 B2
(45) Date of Patent: *Jun. 17, 2014

(54) METHOD AND APPARATUS FOR SCALABLY ENCODING AND DECODING VIDEO SIGNAL

(75) Inventors: Seung Wook Park, Seoul (KR); Ji Ho Park, Seoul (KR); Byeong Moon Jeon, Seoul (KR); Doe Hun Yoon, Seoul (KR); Hyun Wook Park, Daejun-si (KR)

(73) Assignee: LG Electronics Inc., Seoul (KR)

(*) Notice: Subject to any disclaimer, the term of this patent is extended or adjusted under 35 U.S.C. 154(b) by 1457 days.

This patent is subject to a terminal disclaimer.

(21) Appl. No.: 11/657,043

(22) Filed: Jan. 24, 2007

(65) Prior Publication Data

US 2007/0189385 A1 Aug. 16, 2007

Related U.S. Application Data

(63) Continuation-in-part of application No. 11/392,634, filed on Mar. 30, 2006, now Pat. No. 7,864,841, and a continuation-in-part of application No. 11/401,318, filed on Apr. 11, 2006, now Pat. No. 7,746,933, and a continuation-in-part of application No. 11/401,317, filed on Apr. 11, 2006, now Pat. No. 7,688,897, and a continuation-in-part of application No. 11/392,673, filed on Mar. 30, 2006, now Pat. No. 7,864,849, and a continuation-in-part of application No. 11/392,673, filed on Mar. 30, 2006, now Pat. No. 7,970,057.

(30) Foreign Application Priority Data

| Jul. 22, 2005 | (KR) | 10-2005-0066622 |
| Sep. 12, 2005 | (KR) | 10-2005-0084729 |
| Sep. 12, 2005 | (KR) | 10-2005-0084742 |
| Sep. 12, 2005 | (KR) | 10-2005-0084744 |

(51) Int. Cl.
H04N 7/12 (2006.01)
H04N 11/02 (2006.01)
H04N 11/04 (2006.01)

(52) U.S. Cl.
USPC ............ 375/240.12; 375/240.13; 375/240.16; 375/240.17

(58) Field of Classification Search
USPC ............ 375/420.12, 240.12, 240.13, 240.16, 375/240.17
See application file for complete search history.

(56) References Cited

U.S. PATENT DOCUMENTS 4,888,641 A * 12/1989 Isnardi et al. ............ 375/240.25
5,418,570 A 5/1995 Ueno et al.
(Continued)

FOREIGN PATENT DOCUMENTS

CN 1209020 2/1999
CN 1526240 9/2004
(Continued)

OTHER PUBLICATIONS

Li et al., An Arbitrary Ratio Resizer for MPEG Applications, 2000, Retrieved from the Internet <URL: ieeexplore.ieee.org/xpls/abs_all.jsp?arnumber=854494&tag=1>, pp. 1-2 as printed.*

(Continued)

*Primary Examiner* — Saleh Najjar
*Assistant Examiner* — Oleg Korsak
(74) *Attorney, Agent, or Firm* — Harness, Dickey & Pierce, P.L.C.

(57) ABSTRACT

In one embodiment, decoding of a video signal includes predicting at least a portion of a current image in a current layer based on at least a portion of a base image in a base layer and shift information for samples in the predicted current image.

11 Claims, 13 Drawing Sheets

(56) References Cited

U.S. PATENT DOCUMENTS

| | | | |
|---|---|---|---|
| 5,650,824 A * | 7/1997 | Huang | 348/453 |
| 5,712,687 A | 1/1998 | Naveen et al. | |
| 5,973,739 A | 10/1999 | Nilsson | |
| 5,995,150 A * | 11/1999 | Hsieh et al. | 375/240.12 |
| 6,057,884 A | 5/2000 | Chen et al. | |
| 6,510,177 B1 | 1/2003 | De Bonet et al. | |
| 6,510,777 B2 | 1/2003 | Neal | |
| 6,535,559 B2 | 3/2003 | Yagasaki et al. | |
| 6,549,575 B1 | 4/2003 | Butter et al. | |
| 6,697,426 B1 | 2/2004 | Van Der Schaar et al. | |
| 6,728,317 B1 | 4/2004 | Demos | |
| 6,788,347 B1 | 9/2004 | Kim et al. | |
| 6,804,299 B2 | 10/2004 | Moni et al. | |
| 6,836,512 B2 | 12/2004 | Van Der Schaar et al. | |
| 6,847,685 B1 | 1/2005 | Fujiwara et al. | |
| 6,931,063 B2 | 8/2005 | Sun et al. | |
| 7,062,096 B2 | 6/2006 | Lin et al. | |
| 7,136,417 B2 * | 11/2006 | Rodriguez | 375/240.29 |
| 7,450,641 B2 | 11/2008 | Sun et al. | |
| 2003/0035484 A1 | 2/2003 | Prakash et al. | |
| 2004/0008790 A1 | 1/2004 | Rodriguez | |
| 2004/0114689 A1 | 6/2004 | Zhang et al. | |
| 2004/0136352 A1 * | 7/2004 | Fu et al. | 370/341 |
| 2006/0126962 A1 * | 6/2006 | Sun | 382/268 |
| 2007/0086515 A1 | 4/2007 | Kirkenko et al. | |
| 2007/0116131 A1 | 5/2007 | Sun | |
| 2007/0140354 A1 | 6/2007 | Sun | |

FOREIGN PATENT DOCUMENTS

| | | |
|---|---|---|
| CN | 101176349 | 9/2010 |
| KR | 1997-0064261 | 9/1997 |
| KR | 1999-0070553 | 9/1999 |
| KR | 2002-0064932 | 8/2002 |
| KR | 2003-0020382 | 3/2003 |
| KR | 10-2003-0089505 | 11/2003 |
| KR | 10-2004-0096548 | 11/2004 |
| KR | 10-2004-0107437 | 12/2004 |
| KR | 2005-0021487 | 3/2005 |
| KR | 2005-0049644 | 5/2005 |
| TW | 233306 | 5/2005 |
| WO | WO 01/43447 | 6/2001 |
| WO | WO 03/047260 | 6/2003 |
| WO | WO 2006/104364 | 10/2006 |

OTHER PUBLICATIONS

MPEG (Richardson), H.264 and MPEG-4 Video Compression: (chapter 3 Video Coding Concepts), 2004, Wiley, Retrieved from the Internet URL: onlinelibrary.wiley.com/book/10.1002/0470869615>, pp. 1-57 as printed.*

MPEG (Richardson), H.264 and MPEG-4 Video Compression: (chapter 5 MPEG-4 Visual), 2004, Wiley, Retrieved from the Internet URL: onlinelibrary.wiley.com/book/10.1002/0470869615>, pp. 1-59 as printed.*

JVT, JVT-I047r1.doc, 2003, Retrieved from the Internet <URL: wftp3.itu.int/av-arch/jvt-site/2003_09_SanDiego/JVT-I047r1.doc>, pp. 1-28 as printed.*

Office Action for Korean Application No. 2007-7025373 dated Dec. 23, 2008.

Office Action for Korean Application No. 2007-7025371 dated Dec. 23, 2008.

Search Report for corresponding European Application No. 06732851.8 dated Feb. 1, 2011.

JVT: "Description of Core Experiments in SVC," ITU Study Group 16—Video Coding Experts Group—ISO/IEC MPEG & ITU-T VCEG (ISO/IEC JTC1/SC29/SG11 and ITU-T SG16 Q6), No. JVT-N025d0, Feb. 23, 2005, XP030005941.

ISO/IEC CD 13818-2 (MPEG 2 Part 2) ED—International Standards Organization: "ISO/IEC CD 13818-2 (MPEG 2 Part 2): Coding of Audio, Picture, Multimedia and Hypermedia Information—Part 2: Video, Passage Text," Jan. 1, 1993, Coding of Audio, Picture, Multimedia and Hypermedia Information. Dec. 1, 1993. ISO/IEC JTC1/SC29 N659. ISO/IEC CD 13818-2: Information Technology—Generic Coding of Moving Pictures and Associated Audio Information—Part 2: Video, Toyko, ISO, JP, XP002050744.

Cois et al., "Requirement for Extended Spatial Scalability for SVC," Group ISO/IEC MPEG & ITU-T VCEG (ISO/IEC JTC1/SC29/WG11 and ITU-T SG16 Q6), No. M11668, Jan. 12, 2005, XP030040413.

Office Action for Korean Application No. 2007-7025370 dated Jan. 15, 2009.

Office Action for Korean Application No. 2007-7025372 dated Jan. 16, 2009.

Office Action for corresponding Taiwanese Application No. 95111664 dated Feb. 2, 2010.

Notice of Allowance for corresponding Korean Application No. 10-2008-7028742 dated Apr. 21, 2011.

Office Action for corresponding Taiwanese Application No. 095111664 dated Apr. 10, 2009 and English translation thereof.

Office Action for U.S. Appl. No. 11/401,317 dated Aug. 17, 2009.

Office Action for U.S. Appl. No. 12/418,129 dated Sep. 8, 2009.

Notice of Allowance for U.S. Appl. No. 12/418,129 dated Oct. 23, 2009.

Office Action for corresponding U.S. Appl. No. 11/392,634 dated Nov. 16, 2009.

Office Action for corresponding U.S. Appl. No. 11/392,674 dated Nov. 19, 2009.

Search Report for International Application No. PCT/KR2006/001200 dated Jun. 26, 2006.

Search Report for International Application No. PCT/KR2006/001339 dated Jun. 28, 2006.

Search Report for International Application No. PCT/KR2006/001341 dated Jul. 24, 2006.

Office Action for corresponding U.S. Appl. No. 11/657,011 dated Jul. 7, 2011.

S-W Park et al., "Intra BL prediction considering phase shift," Joint Video Team (JVT) of ISO/IEC MPEG & ITU-T VCEG, pp. 1-16, Apr. 16, 2005.

Francois, E. et al., "Extended Spatial Scalability," MPEG Meeting, Jan. 12, 2005.

"H.262/MPEG-2, Coding of moving video, $2^{nd}$ Edition," ITU-T Recommendation Series H, Feb. 1, 2000.

Ying C. et al., "New 4:2:0 format," JVT Meeting, Joint Video Team (JVT) of ISO/IEC MPEG & ITU-T VCEG, pp. 1-13, May 24, 2005.

European Search Report dated Oct. 24, 2012.

U.S. Office Action mailed Mar. 6, 2012 for U.S. Appl. No. 11/657,011.

MPEG (Richardson), H.264 and MPEG-4 Video Compression: (chapter 5 MPEG-4 Visual), 2004, Wiley, Retrieved from the Internet URL: onlinelibrary.wiley.com/book10.1002/0470869615>, pp. 1-59 as printed.

Li et al., An Arbitrary Ratio Resizer for MPEG Applications, 2000, Retrieved from the Internet URL:ieeexplore.ieee.org/xpls/abs_all.jsp?arnumber=854494&tag=1, pp. 1-2 as printed.

JVT, JVT-1047r1.doc, 2003, Retrieved from the Internet URL:wftp3.itu.int/av-arch/jvt-site/2003_09_SanDiego/JVT-1047r1.doc, pp. 1-28 as printed.

U.S. Office Action mailed Mar. 6, 2012 for U.S. Appl. No. 11/657,012.

* cited by examiner

METHOD AND APPARATUS FOR SCALABLY ENCODING AND DECODING VIDEO SIGNAL

DOMESTIC PRIORITY INFORMATION

This application is a continuation-in-part application of application Ser. No. 11/392,634 now U.S. Pat. No. 7,864,841, Ser. No. 11/401,318 now U.S. Pat. No. 7,746,933, Ser. No. 11/401,317 now U.S. Pat. No. 7,688,897, Ser. No. 11/392,674 now U.S. Pat. No. 7,864,849 and Ser. No. 11/392,673 now U.S. Pat. No. 7,970,057 filed Mar. 30, 2006, Apr. 11, 2006, Apr. 11, 2006, Mar. 30, 2006 and Mar. 30, 2006, respectively, the entire contents of each of which are hereby incorporated by reference.

This application also claims priority under 35 U.S.C. §119 on U.S. Provisional Application No. 60/667,115, filed on Apr. 1, 2005; U.S. Provisional Application No. 60/670,246, filed on Apr. 12, 2005; U.S. Provisional Application No. 60/670,241, filed on Apr. 12, 2005; and U.S. Provisional Application No. 60/670,676 filed Apr. 13, 2005; the entire contents of each of which are hereby incorporated by reference.

This application claims priority under 35 U.S.C. §119 on Korean Patent Application Nos. 10-2005-0084744, 10-2005-0066622, 10-2005-0084729 and 10-2005-0084742 filed on Sep. 12, 2005, Jul. 22, 2005, Sep. 12, 2005 and Sep. 12, 2005, respectively, the entire contents of each of which are hereby incorporated by reference.

BACKGROUND OF TH INVENTION

1. Field of the Invention

The present invention relates to scalable encoding and decoding of a video signal.

2. Description of the Related Art

It is difficult to allocate high bandwidth, required for TV signals, to digital video signals wirelessly transmitted and received by mobile phones and notebook computers. It is expected that similar difficulties will occur with mobile TVs and handheld PCs, which will come into widespread use in the future. Thus, video compression standards for use with mobile devices should have high video signal compression efficiencies.

Such mobile devices have a variety of processing and presentation capabilities so that a variety of compressed video data forms should be prepared. This means that a variety of different quality video data with different combinations of a number of variables such as the number of frames transmitted per second, resolution, and the number of bits per pixel should be provided based on a single video source. This imposes a great burden on content providers.

Because of the above, content providers prepare high-bitrate compressed video data for each source video and perform, when receiving a request from a mobile device, a process of decoding compressed video and encoding it back into video data suited to the video processing capabilities of the mobile device. However, this method entails a transcoding procedure including decoding, scaling, and encoding processes, which causes some time delay in providing the requested data to the mobile device. The transcoding procedure also requires complex hardware and algorithms to cope with the wide variety of target encoding formats.

The Scalable Video Codec (SVC) has been developed in an attempt to overcome these problems. This scheme encodes video into a sequence of pictures with the highest image quality while ensuring that part of the encoded picture (frame) sequence (specifically, a partial sequence of frames intermittently selected from the total sequence of frames) can be decoded to produce a certain level of image quality.

Motion Compensated Temporal Filtering MCTF) is an encoding scheme that has been suggested for use in the Scalable Video Codec. The MCTF scheme has a high compression efficiency (i.e., a high coding efficiency) for reducing the number of bits transmitted per second. The MCTF scheme is likely to be applied to transmission environments such as a mobile communication environment where bandwidth is limited.

Although it is ensured that part of a sequence of pictures encoded in the scalable MCTF coding scheme can be received and processed to video with a certain level of image quality as described above, there is still a problem in that the image quality is significantly reduced if the bitrate is lowered. One solution to this problem is to provide an auxiliary picture sequence for low bitrates, for example, a sequence of pictures that have a small screen size and/or a low frame rate. One example is to encode and transmit not only a main picture sequence of 4CIF (Common Intermediate Format) but also an auxiliary picture sequence of CIF and an auxiliary picture sequence of QCIF (Quarter CIF) to decoders. Each sequence is referred to as a layer, and the higher of two given layers is referred to as an enhanced layer and the lower is referred to as a base layer.

More often, the auxiliary picture sequence is referred to as a base layer (BL, and the main picture sequence is referred to as an enhanced or enhancement layer. Video signals of the base and enhanced layers have redundancy since the same video content is encoded into two layers with different spatial resolution or different frame rates. To increase the coding efficiency of the enhanced layer, a video signal of the enhanced layer may be predicted using motion information and/or texture information of the base layer. This prediction method is referred to as inter-layer prediction.

FIG. 11 illustrates examples of an intra BL prediction method and an inter-layer residual prediction method, which are inter-layer prediction methods for encoding the enhanced layer using the base layer.

The intra BL prediction method uses a texture (or image data) of the base layer. Specifically, the intra BL prediction method produces predictive data of a macroblock of the enhanced layer using a corresponding block of the base layer encoded in an intra mode. The term "corresponding block" refers to a block which is located in a base layer frame temporally coincident with a frame including the macroblock and which would have an area covering the macroblock if the base layer frame were enlarged by the ratio of the screen size of the enhanced layer to the screen size of the base layer. The intra BL prediction method uses the corresponding block of the base layer after enlarging the corresponding block by the ratio of the screen size of the enhanced layer to the screen size of the base layer through upsampling.

The inter-layer residual prediction method is similar to the intra BL prediction method except that it uses a corresponding block of the base layer encoded so as to contain residual data, which is data of an image difference, rather than a corresponding block of the base layer containing image data. The inter-layer residual prediction method produces predictive data of a macroblock of the enhanced layer encoded so as to contain residual data, which is data of an image difference, using a corresponding block of the base layer encoded so as to contain residual data. Similar to the intra BL prediction method, the inter-layer residual prediction method uses the corresponding block of the base layer containing residual data after enlarge the corresponding block by the ratio of the screen size of the enhanced layer to the screen size of the base layer through upsampling.

A base layer with lower resolution for use in the inter-layer prediction method is produced by downsampling a video source. Corresponding pictures (frames or blocks) in enhanced and base layers produced from the same video source may be out of phase since a variety of different downsampling techniques and downsampling ratios (i.e., horizontal and/or vertical size reduction ratios) may be employed.

FIG. 12 illustrates a phase relationship between enhanced and base layers. A base layer may be produced (i) by sampling a video source at lower spatial resolution separately from an enhanced layer or (ii) by downsampling an enhanced layer with higher spatial resolution. In the example of FIG. 12, the downsampling ratio between the enhanced and base layers is 2/3.

A video signal is managed as separate components, namely, a luma component and two chroma components. The luma component is associated with luminance information Y and the two chroma components are associated with chrominance information Cb and Cr. A ratio of 4:2:0 (Y:Cb:Cr) between luma and chroma signals is widely used. Samples of the chroma signal are typically located midway between samples of the luma signal. When an enhanced layer and/or a base layer are produced directly from a video source, luma and chroma signals of the enhanced layer and/or the base layer are sampled so as to satisfy the 4:2:0 ratio and a position condition according to the 4:2:0 ratio.

In the above case (i), the enhanced and base layers may be out of phase as shown in section (a) of FIG. 12 since the enhanced and base layers may have different sampling positions. In the example of section (a), luma and chroma signals of each of the enhanced and base layers satisfy the 4:2:0 ratio and a position condition according to the 4:2:0 ratio.

In the above case (ii), the base layer is produced by downsampling luma and chroma signals of the enhanced layer by a specific ratio. If the base layer is produced such that luma and chroma signals of the base layer are in phase with luma and chroma signals of the enhanced layer, the luma and chroma signals of the base layer do not satisfy a position condition according to the 4:2:0 ratio as illustrated in section (b) of FIG. 12.

In addition, if the base layer is produced such that luma and chroma signals of the base layer satisfy a position condition according to the 4:2:0 ratio, the chroma signal of the base layer is out of phase with the chroma signal of the enhanced layer as illustrated in section (c) of FIG. 12. In this case, if the chroma signal of the base layer is upsampled by a specific ratio according to the inter-layer prediction method, the upsampled chroma signal of the base layer is out of phase with the chroma signal of the enhanced layer.

Also in case (ii), the enhanced and base layers may be out of phase as illustrated in section (a).

That is, the phase of the base layer may be changed in the downsampling procedure for producing the base layer and in the upsampling procedure of the inter-layer prediction method, so that the base layer is out of phase with the enhanced layer, thereby reducing coding efficiency.

Also, video frames in sequences of different layers may have different aspect ratios. For example, video frames of the higher sequence (i.e., the enhanced layer) may have a wide aspect ratio of 16:9, whereas video frames of the lower sequence (i.e., the base layer) may have a narrow aspect ratio of 4:3. In this case, there maybe a need to determine which part of a base layer picture is to be used for an enhanced layer picture or for which part of the enhanced layer picture the base layer picture is to be used when performing prediction of the enhanced layer picture.

SUMMARY OF THE INVENTION

In one embodiment, decoding of a video signal includes predicting at least a portion of a current image in a current layer based on at least a portion of a base image in a base layer and shift information for samples in the predicted current image. For example, the samples may be luma and/or chroma samples.

In one embodiment, the shift information is based on corresponding samples in the portion of the base image.

In another embodiment, the predicting step predicts the portion of the current image based on at least part of an up-sampled portion of the base image and the shift information.

In one embodiment, the shift information is phase shift information.

In an embodiment, the predicting step may obtain the shift information from a header of a slice in the base layer, and in another embodiment the shift information may be obtained from a sequence level header in the current layer.

Other related embodiments include methods of encoding a video signal, and apparatuses for encoding and decoding a video signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF EXAMS EMBODIMENTS

Example embodiments of the present invention will now be described in detail with reference to the accompanying drawings.

Figure 1A:
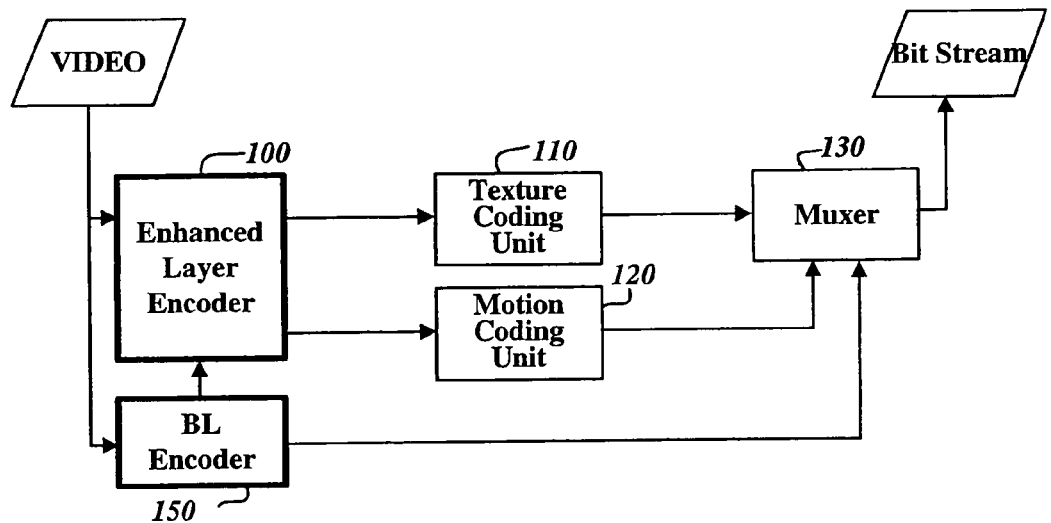
FIG. 1a is a block d of an embodiment of a video signal encoding apparatus to which a scalable video signal coding method according to the present invention is applied.

FIG. 1a is a block diagram of a video signal encoding apparatus to which a scalable video signal coding method according to the present invention is applied. Although the apparatus of FIG. 1a is implemented to code an input video signal in two layers, principles of the present invention described below can also be applied when a video signal is coded in three or more layers. The present invention can also be applied to any scalable video coding scheme, without being limited to an MCTF scheme which is described below as an example.

The video signal encoding apparatus shown in FIG. 1a comprises an enhanced layer (EL) encoder 100 to which the present invention is applied, a texture coding unit 110, a motion coding unit 120, a base layer encoder 150, and a muxer (or multiplexer) 130. The EL encoder 100 is an enhanced layer encoder which encodes an input video signal on a per macroblock basis according to a specified encoding scheme (e.g., an MCTF scheme) and generates suitable management information. The texture coding unit 110 converts information of encoded macroblocks into a compressed bitstream. The motion coding unit 120 codes motion vectors of image blocks obtained by the EL encoder 100 into a compressed bitstream according to a specified scheme. The base layer encoder 150 encodes an input video signal according to a specified scheme, for example, according to the MPEG-1, 2 or 4 standard or the H.261, H.263 or H.264 standard, and produces a small-screen picture sequence, for example, a sequence of pictures scaled down to 25% of their original size. The muxer 130 encapsulates the output data of the texture coding unit 110, the small-screen picture sequence output from the base layer encoder 150, and the output vector data of the motion coding unit 120 into a desired format. The muxer 130 then multiplexes and outputs the encapsulated data into a desired transmission format.

The base layer encoder 150 can provide a low-bitrate data stream not only by encoding an input video signal into a sequence of pictures having a smaller screen size than pictures of the enhanced layer, but also by encoding an input video signal into a sequence of pictures having the same screen size as pictures of the enhanced layer at a lower frame rate than the enhanced layer. In the embodiments of the present invention described below, the base layer is encoded into a small-screen picture sequence, and the small-screen picture sequence is referred to as a base layer sequence and the frame sequence output from the EL encoder 100 is referred to as an enhanced layer sequence.

Figure 1B:
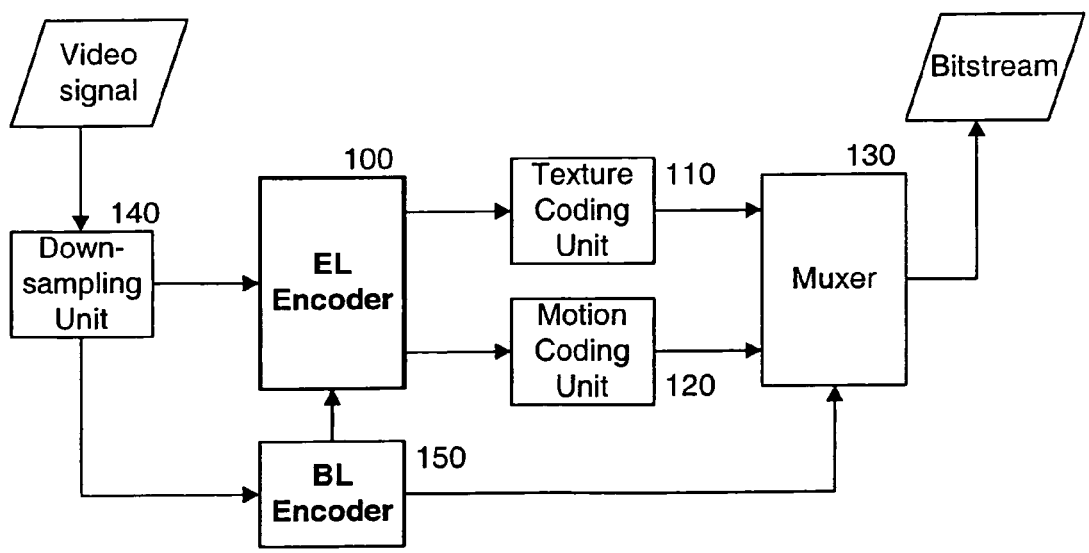
FIG. 1b is a block diagram of another embodiment of a video signal encoding apparatus to which a scalable video signal coding method according to the present invention is applied.

FIG. 1b illustrates a block d of another embodiment video signal encoding apparatus to which a scalable video signal coding method according to the present invention is applied. This embodiment is the same as the embodiment of FIG. 1a except for the addition of the downsampling unit 140. The downsampling unit 140 produces an enhanced layer signal directly from an input video signal or by downsampling the input video signal, and produces a base layer signal by downsampling the input video signal or the enhanced layer signal according to a specific scheme. The specific scheme will depend on the applications or devices receiving each layer; and therefore, is a matter of design choice. Here, the EL encoder 100 encodes the enhanced layer signal generated by the downsampling unit 140 on a per macroblock basis in a scalable fashion according to a specified encoding scheme (for example, an MCTF scheme), and generates suitable management information. Also, the BL encoder 150 encodes the base layer signal generated by the downsampling unit 140 according to a specified scheme, for example, according to the MPEG-1, 2 or 4 standard or the H.261 or H.264 standard, and produces a small-screen picture sequence, for example, a sequence of pictures scaled down to 25% of their original size if needed.

Figure 2:
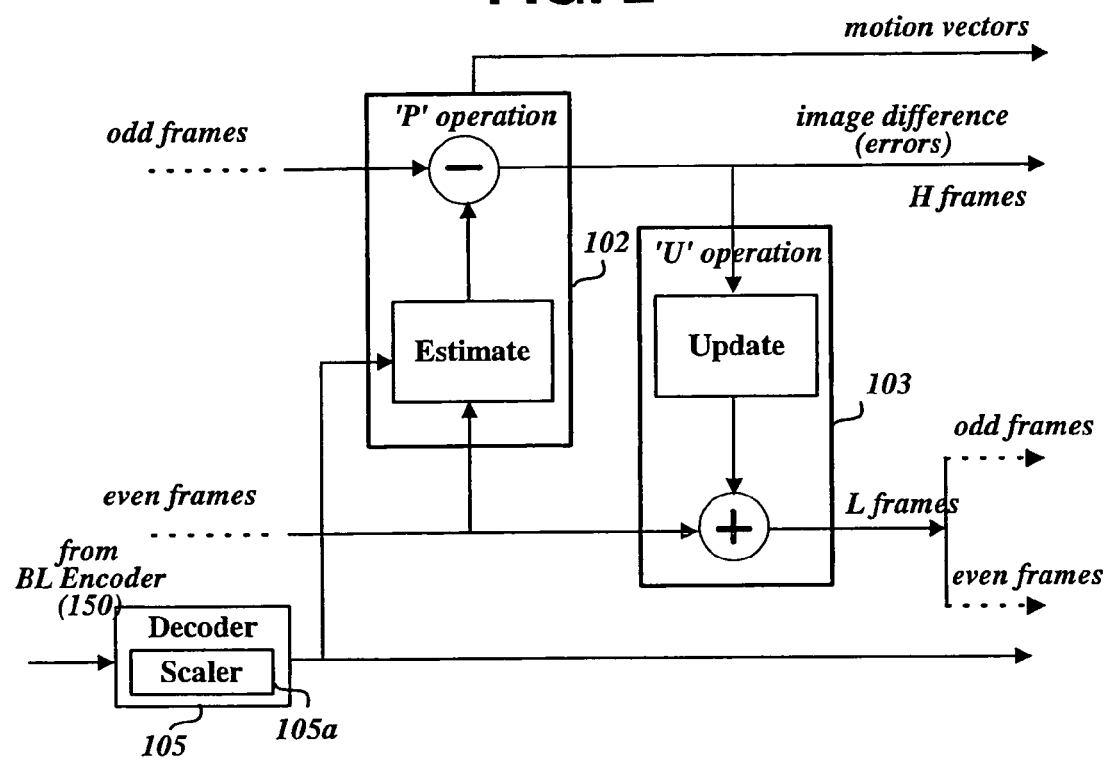
FIG. 2 is a block diagram of part of an EL encoder shown in FIGS. 1a and 1b responsible for carrying out image estimation/prediction and update operations.

In each embodiment, the EL encoder 100 performs motion estimation and prediction operations on each target macroblock in a video frame. The EL encoder 100 also performs an update operation for each target macroblock by adding an image difference of the target macroblock from a corresponding macroblock in a neighbor frame to the corresponding macroblock in the neighbor frame. FIG. 2 illustrates some elements of the EL encoder 100 for carrying out these operations.

The elements of the EL encoder 100 shown in FIG. 2 include an estimator/predictor 102, an updater 103, and a decoder 105. The decoder 105 decodes an encoded stream received from the base layer encoder 150, and enlarges decoded small-screen frames to the size of frames in the enhanced layer using an internal scaler 105a. The estimator/predictor 102 searches for a reference block of each macroblock in a current frame, which is to be coded into residual data, in adjacent frames prior to or subsequent to the current frame and in frames enlarged by the scaler 105a. The estimator/predictor 102 then obtains an image difference (i.e., a pixel-to-pixel difference) of each macroblock in the current frame from the reference block or from a corresponding block in a temporally coincident frame enlarged by the scaler 105a, and codes the image difference into the macroblock. The estimator/predictor 102 also obtains a motion vector originating from the macroblock and extending to the reference block. The updater 103 performs an update operation for a macroblock in the current frame, whose reference block has been found in frames prior to or subsequent to the current frame, by multiplying the image difference of the macroblock by an appropriate constant (for example, ½ or ¼) and adding the resulting value to the reference block. The operation carried out by the updater 103 is referred to as a 'U' operation, and a frame produced by the 'U' operation is referred to as an 'L' frame.

The estimator/predictor 102 and the updater 103 of FIG. 2 may perform their operations on a plurality of slices, which are produced by dividing a single frame, simultaneously and in parallel instead of performing their operations on the video frame. A frame (or slice) having an image difference, which is produced by the estimator/predictor 102, is referred to as an 'H' frame (or slice). The 'H' frame (or slice) contains data having high frequency components of the video signal. In the following description of the embodiments, the term 'picture' is used to indicate a slice or a frame, provided that the use of the term is technically feasible.

The estimator/predictor 102 divides each of the input video frames (or L frames obtained at the previous level) into macroblocks of a desired size. For each divided macroblock, the estimator/predictor 102 searches for a block, whose image is most similar to that of each divided macroblock, in previous/next neighbor frames of the enhanced layer and/or in base layer frames enlarged by the scaler 105a That is, the estimator/predictor 102 searches for a macroblock temporally correlated with each divided macroblock. A block having the most similar image to a target image block has the smallest image difference form the target image block. The image difference of two image blocks is defined, for example, as the sum or average of pixel-to-pixel differences of the two image blocks. Of blocks having a threshold image difference or less from a target macroblock in the current frame, a block having the smallest image difference from the target macroblock is referred to as a reference block. A picture including the reference block is referred to as a reference picture. For each macroblock of the current frame, two reference blocks (or two reference pictures) may be present in a frame (including a base layer frame) prior to the current frame, in a frame (including a base layer frame) subsequent thereto, or one in a prior frame and one in a subsequent frame.

If the reference block is found, the estimator/predictor 102 calculates and outputs a motion vector from the current block to the reference block. The estimator/predictor 102 also calculates and outputs pixel error values (i.e., pixel difference values) of the current block from pixel values of the reference block which is present in either the prior frame or the subsequent frame, or from average pixel values of the two reference blocks, which are present in the prior and subsequent frames. The image or pixel difference values are also referred to as residual data.

If no macroblock having a desired threshold image difference or less from the current macroblock is found in the two neighbor frames (including base layer frames) via the motion estimation operation, the estimator/predictor 102 determines whether or not a frame in the same time zone as the current frame (hereinafter also referred to as a "temporally coincident frame") or a flame in a close time zone to the current frame (hereinafter also referred to as a "temporally close frame") is present in the base layer sequence. If such a frame is present in the base layer sequence, the estimator/predictor 102 obtains the image difference (i.e., residual data) of the current macroblock from a corresponding macroblock in the temporally coincident or close frame based on pixel values of the two macroblocks, and does not obtain a motion vector of the current macroblock with respect to the corresponding macroblock. The close time zone to the current frame corresponds to a time interval including frames that can be regarded as having the same image as the current frame. Information of this time interval is carried within an encoded steam.

Figure 3A:
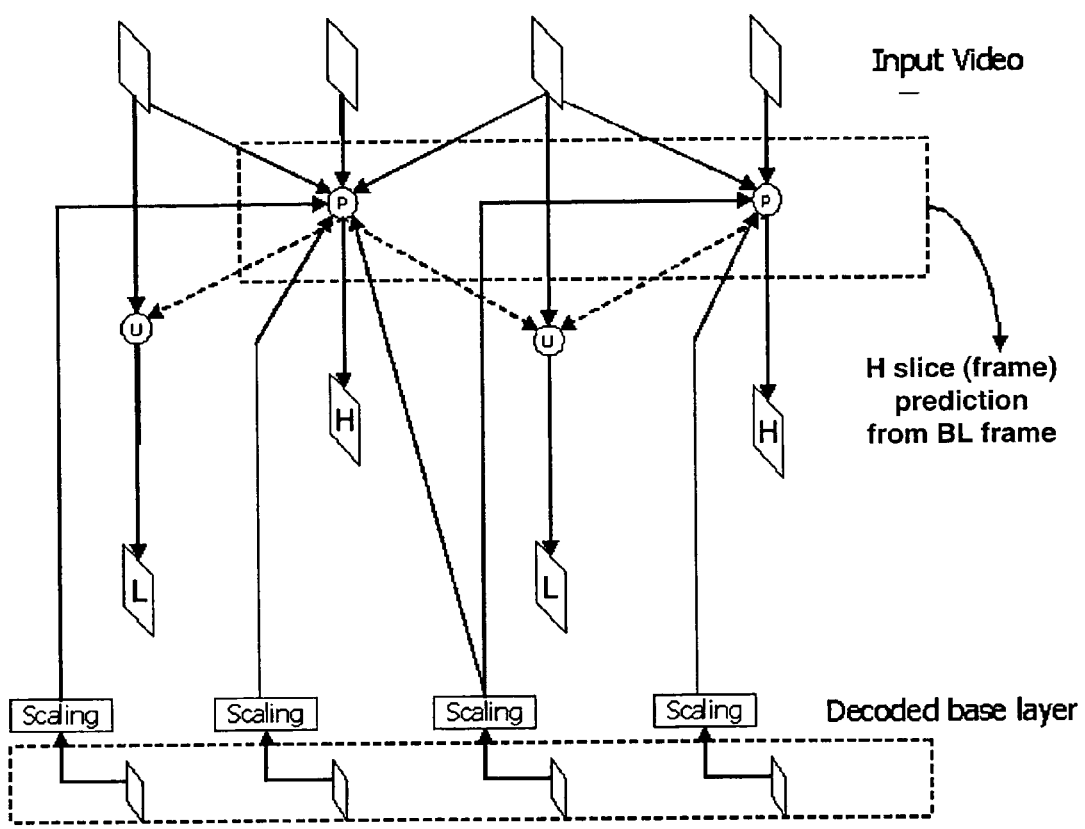
FIGS. 3a and 3b illustrate the relationship between enhanced layer frames and base layer frames which can be used as reference frames for converting an enhanced layer frame to an H frame having a predictive image.

The above operation of the estimator/predictor 102 is referred to as a 'P' operation. When the estimator/predictor 102 performs the 'P' operation to produce an H frame by searching for a reference block of each macroblock in the current frame and coding each macroblock into residual data, the estimator/predictor 102 can selectively use, as reference pictures, enlarged pictures of the base layer received from the scaler 105a, in addition to neighbor L frames of the enhanced layer prior to and subsequent to the current frame, as shown in FIG. 3a.

Figure 3B:
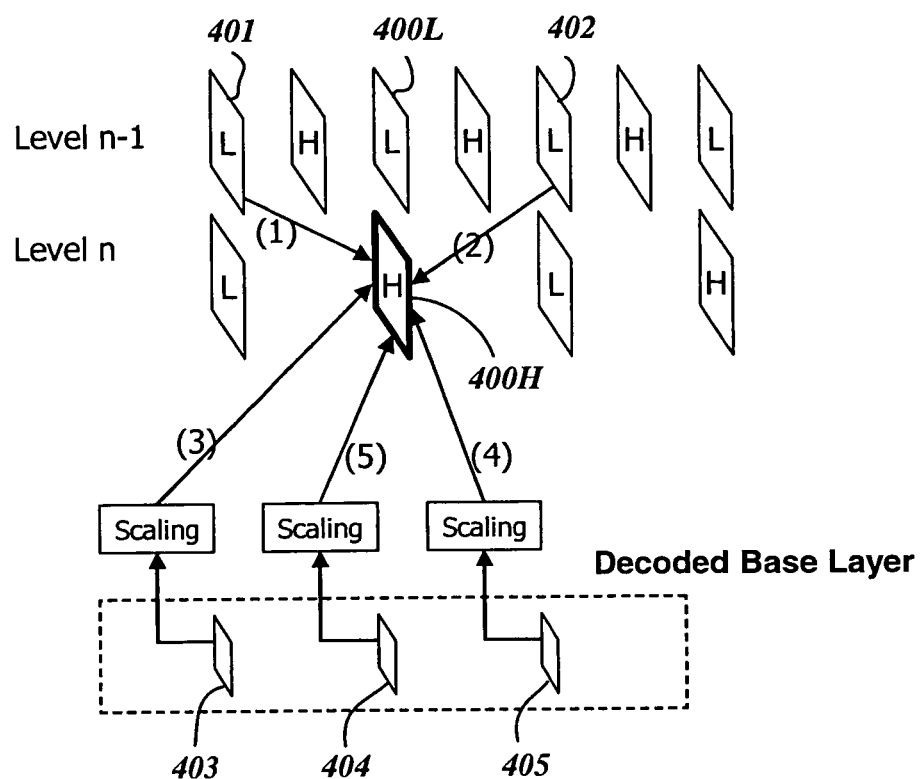

In an example embodiment of the present invention, five flames are used to produce each H flame. FIG. 3b shows five flames that can be used to produce an H flame. As shown, a current L flame 400L has L flames 401 prior to and L frames 402 subsequent to the current L frame 400L. The current L flame 400L also has a base layer flame 405 in the same time zone. One or two flames from among the L flames 401 and 402 in the same MCTF level as a current L flame 400L, the flame 405 of the base layer in the same time zone as the L flame 400L, and base layer frames 403 and 404 prior to and subsequent to the frame 405 are used as reference pictures to produce an H flame 400H frame the current L frame 400L. As will be appreciated from the above discussion, there are various reference block selection modes. To inform the decoder of which mode is employed, the EL encoder 100 transmits 'reference block selection mode' information to the texture coding unit 110 after inserting/writing it into a field at a specified position of a header area of a corresponding macroblock.

Figure 4:
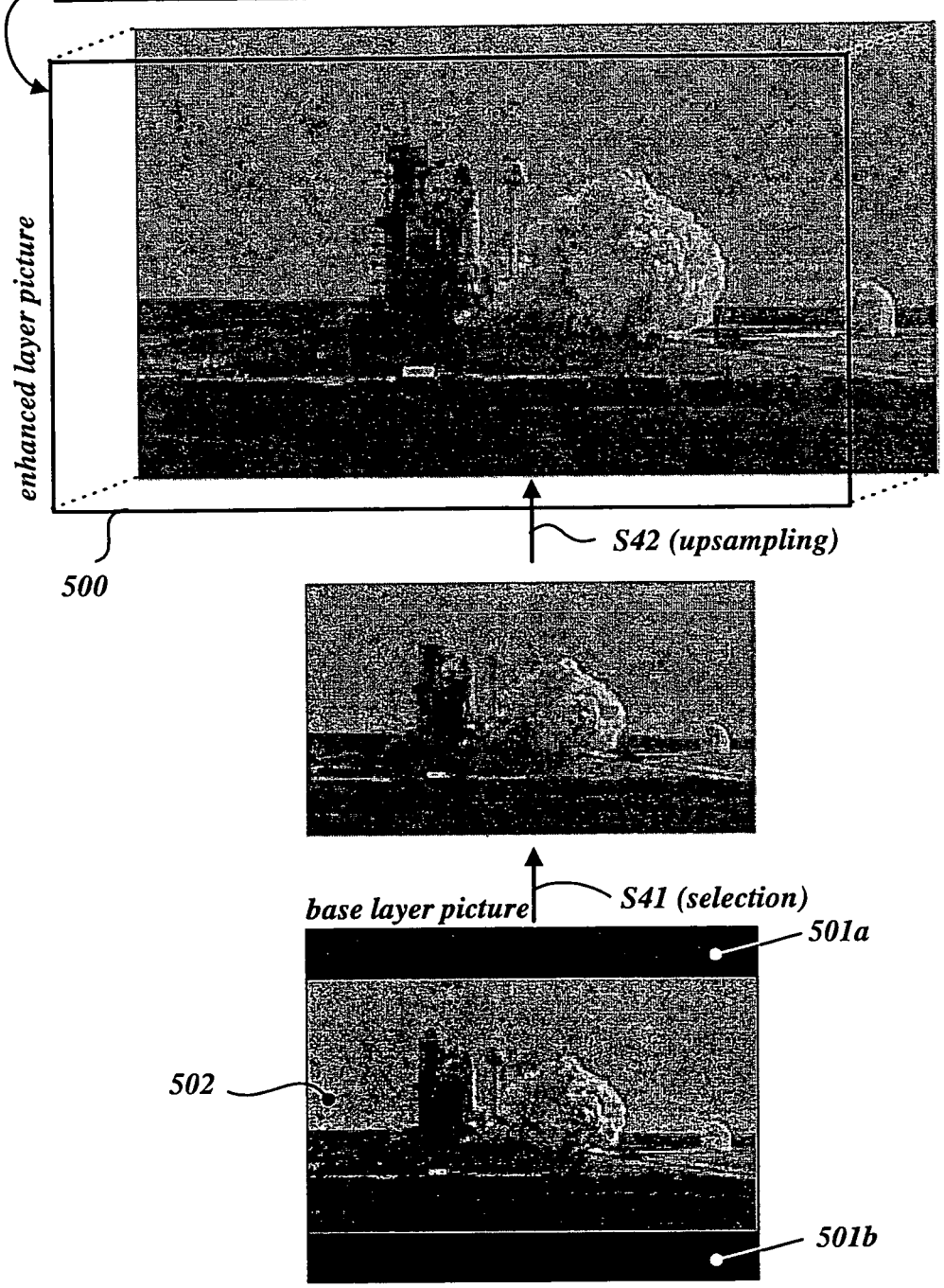
FIG. 4 illustrates how part of a base layer picture is selected and enlarged to be used for a prediction operation of an enhanced layer picture according to an embodiment of the present invention.

When a picture of the base layer is selected as a reference picture for prediction of a picture of the enhanced layer in the reference picture selection method as shown in FIG. 3b, all or part of the base layer picture can be used for prediction of the enhanced layer picture. For example, as shown in FIG. 4, when a base layer picture has an aspect ratio of 4:3, an actual image portion 502 of the base layer picture has an aspect ratio of 16:9, and an enhanced layer picture 500 has an aspect ratio of 16:9, upper and lower horizontal portions 501a and 501b of the base layer picture contain invalid data. In this case, only the image portion 502 of the base layer picture is used for prediction of the enhanced layer picture 500. To accomplish this, the scaler 105a selects (or crops) the image portion 502 of the base layer picture (S41), up-samples the selected image portion 502 to enlarge it to the size of the enhanced layer picture 500 (S42), and provides the enlarged image portion to the estimator/predictor 102.

The EL encoder 100 incorporates position information of the selected portion of the base layer picture into a header of the current picture coded into residual data. The EL encoder 100 also sets and inserts a flag "flag_base_layer_cropping", which indicates that part of the base layer picture has been selected and used, in the picture header at an appropriate position so that the flag is delivered to the decoder. The position information is not transmitted when the flag "flag_base_layer_cropping" is reset.

Figure 5A:
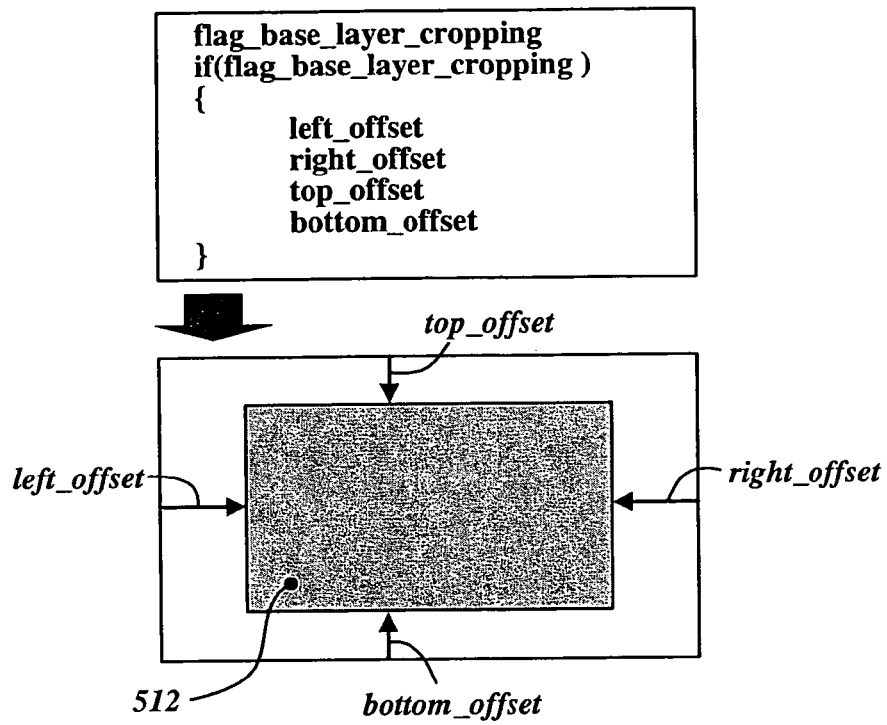
FIGS. 5a and 5b illustrate embodiments of the structure of information regarding a positional relationship of a base layer picture to an enhanced layer picture, which is transmitted to the decoder, according to the present invention.
Figure 5B:
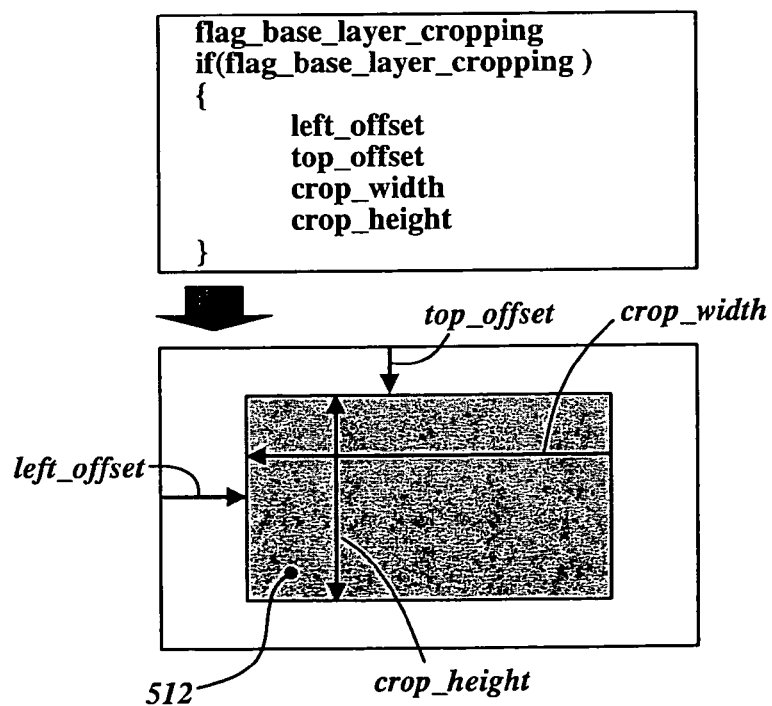

FIGS. 5a and 5b illustrate embodiments of the structure of information regarding a selected portion 512 of a base layer picture. In the embodiment of FIG. 5a, the selected portion 512 of the base layer picture is specified by offsets (left_offset, right_offset, top_offset, and bottom_offset) from the left, right, top and bottom boundaries of the base layer picture. The left offset indicates a position offset between left side pixels (or, for example, at least one pixel) in the base layer image and left side pixels in the selected portion 512. The top offset indicates a position offset between top side pixels (or, for example, at least one pixel) in the base layer image and top side pixels in the selected portion 512. The right offset indicates a position offset between right side pixels (or, for example, at least one pixel) in the base layer image and right side pixels in the selected portion 512. The bottom side offset indicates a position offset between bottom side pixels (or, for example, at least one pixel) in the base layer image and bottom side pixels in the selected portion 512. In the embodiment of FIG. 5b, the selected portion 512 of the base layer picture is specified by offsets (left_offset and top_offset) from the left and top boundaries of the base layer picture and by the width and height (crop_width and crop_height) of the selected portion 512. Various other specifying methods are also possible.

Figure 6:
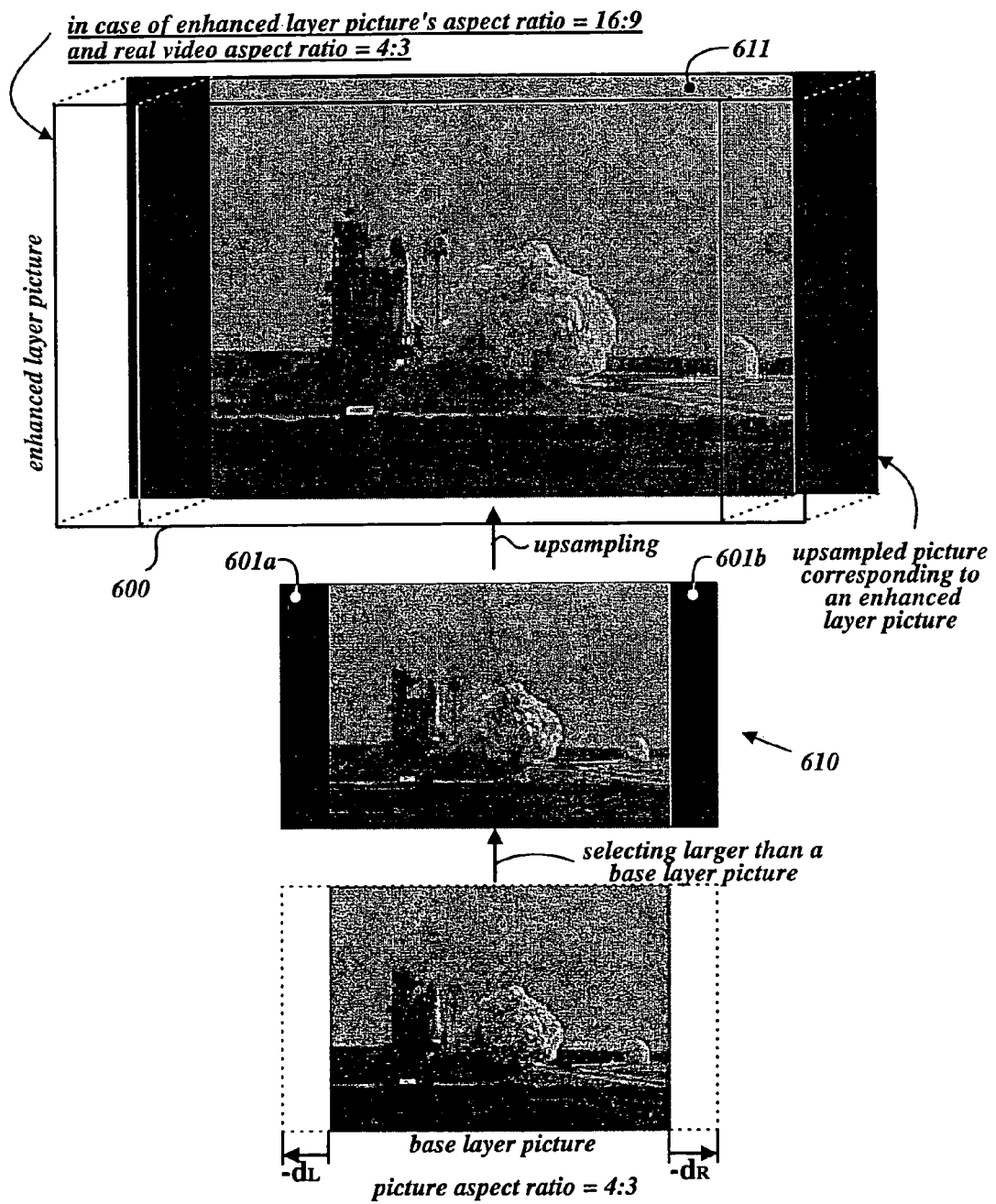
FIG. 6 illustrates how an area including a base layer picture is enlarged to be used for a prediction operation of an enhanced layer picture according to another embodiment of the present invention.

The offsets in the information of the selected portion shown in FIGS. 5a and 5b may have negative values. For example, as shown in FIG. 6, when a base layer picture has an aspect ratio of 4:3, an enhanced layer picture 600 has an aspect ratio of 16:9, and an actual image portion of the picture has an aspect ratio of 4:3, the left and right offset values (left_offset and right_offset) have negative values $-d_L$ and $-d_R$. Portions 601a and 601b extended from the base layer picture are specified by the negative values $-d_L$ and $-d_R$. The extended portions 601a and 601b are padded with offscreen data, and a picture 610 including the extended portions 601a and 601b is upsampled to have the same size as that of the enhanced layer picture 600. Accordingly, data of an area 611 in the enlarged base layer picture, which corresponds to an actual image portion of the enhanced layer picture 600, can be used for prediction of the actual image portion of the enhanced layer picture 600.

Since the offset fields of the information illustrated in FIGS. 5a and 5b may have negative values, the same advantages as described above in the example of FIG. 4 can be achieved by using the information of FIGS. 5a and 5b as position information of an area overlapping with the enhanced layer picture, which is to be associated with the enlarged base layer picture, instead of using the information of FIGS. 5a and 5b for specifying the selected area in the base layer picture.

Figure 7:
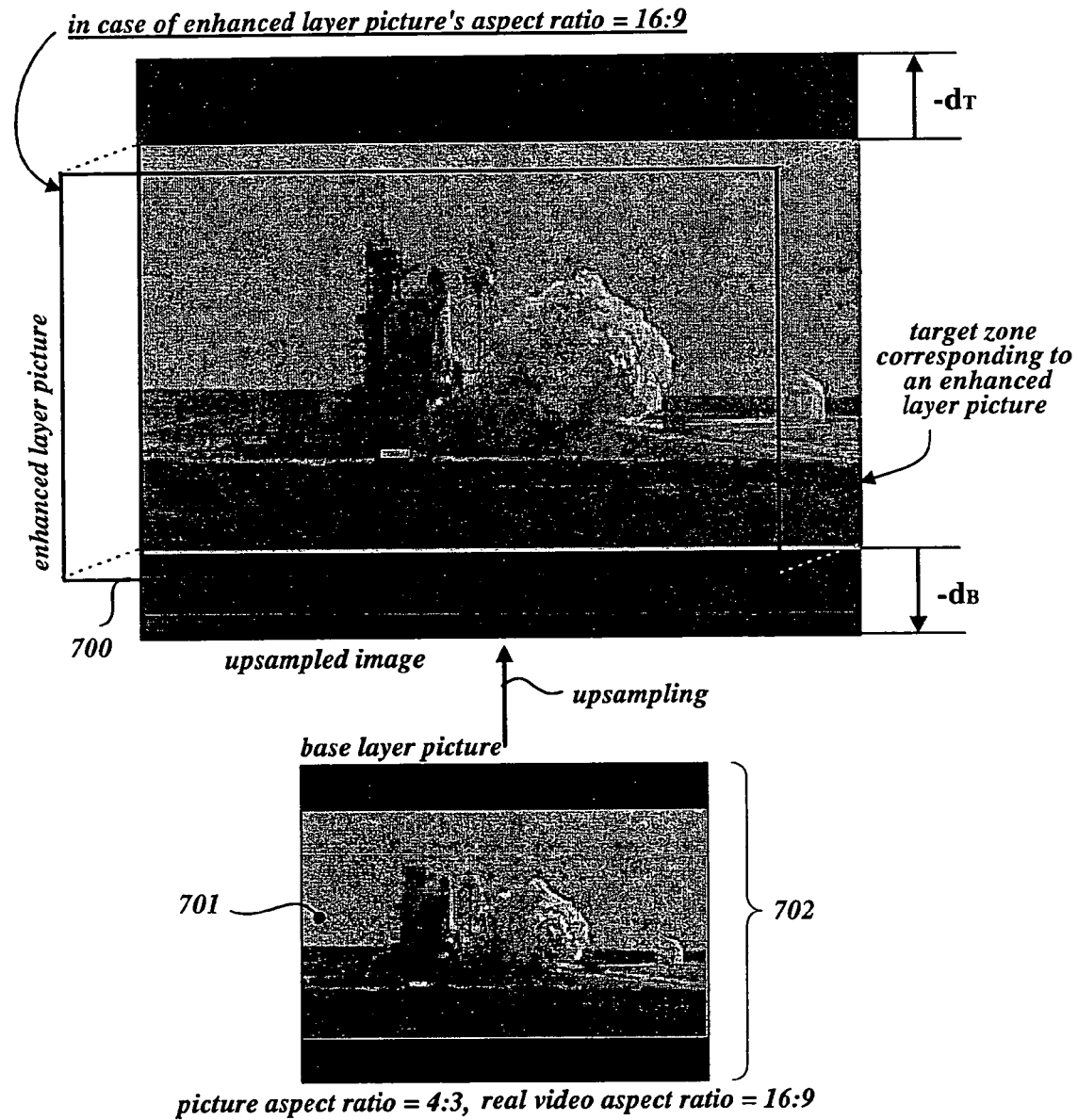
FIG. 7 illustrates how a base layer picture is enlarged to a larger area than an enhanced layer picture so as to be used for a prediction operation of the enhanced layer picture according to yet another embodiment of the present invention.

Specifically, with reference to FIG. 7, when a base layer picture 702 is upsampled so that an actual image area 701 of the base layer picture 702 is enlarged to the size of an enhanced layer picture 700, the enlarged (e.g., up-sampled) picture corresponds to an area larger than the enhanced layer picture 700. In this example, top and bottom offsets top_offset and bottom_offset are included in the position information of an area overlapping with the enhanced layer picture 700. These offsets correspond to the enlarged base layer picture, and are assigned negative values $-d_T$ and $-d_B$ so that only an actual image area of the enlarged base layer picture is used for prediction of the enhanced layer picture 700. In the example of FIG. 7, left and right offsets of the position information of the area corresponding to the enlarged base layer picture are zero. However, it will be understood that the left and right offsets may be non-zero, and also correspond to the enlarged base layer picture. It will also be appreciated that a portion of the image in the enlarged base layer picture may not be used in determining the enhanced layer picture. Similarly, when the offset information corresponds directly to the base layer picture, as opposed to the up-sample base layer picture, a portion of the image in the base layer picture may not be used in determining the enhanced layer picture.

Furthermore, in the embodiment of FIG. 7, the left offset indicates a position offset between left side pixels (or, for example, at least one pixel) in the up-sampled base layer image and left side pixels in the enhanced layer image. The top offset indicates a position offset between top side pixels (or, for example, at least one pixel) in the up-sampled base layer image and top side pixels in the enhanced layer image. The right offset indicates a position offset between right side pixels (or, for example, at least one pixel) in the up-sampled base layer image and right side pixels in the enhanced layer image. The bottom side offset indicates a position offset between bottom side pixels (or, for example, at least one pixel) in the up-sampled base layer image and bottom side pixels in the enhanced layer image.

As described above, the information of FIGS. 5a and 5b can be used as information for selection of a portion of a base layer picture, which is to be used for prediction of an enhanced layer picture, or can be used as position information of an area overlapping with an enhanced layer picture, which is to be associated with a base layer picture for use in prediction of the enhanced layer picture.

Information of the size and aspect ratio of the base layer picture, mode information of an actual image of the base layer picture, etc., can be determined by decoding, for example, from a sequence header of the encoded base layer stream Namely, the information may be recorded in the sequence header of the encoded base layer stream. Accordingly, the position of an area overlapping with the enhanced layer picture, which corresponds to the base layer picture or the selected area in the base layer picture described above, are determined based on position or offset information, and all or part of the base layer picture is used to suit this determination.

Returning to FIGS. 1a, 1b and 2, the EL encoder 100 generates a sequence of H frames and a sequence of L frames, respectively, by performing the 'P' and 'U' operations described above on a certain-length sequence of pictures, for ample, on a group of pictures (GOP). Then, an estimator/predictor and an updater at a next serially-connected stage (not shown) generates a sequence of H frames and a sequence of L frames by repeating the 'P' and 'U' operations on the generated L frame sequence. The 'P' and 'U' operations are performed an appropriate number of times (for example, until one L frame is produced per GOP) to produce a final enhanced layer sequence.

The data stream encoded in the method described above is transmitted by wire or wirelessly to a decoding apparatus or is delivered via recording media. The decoding apparatus reconstructs the original video signal in the enhanced and/or base layer according to the method described below.

Figure 8:
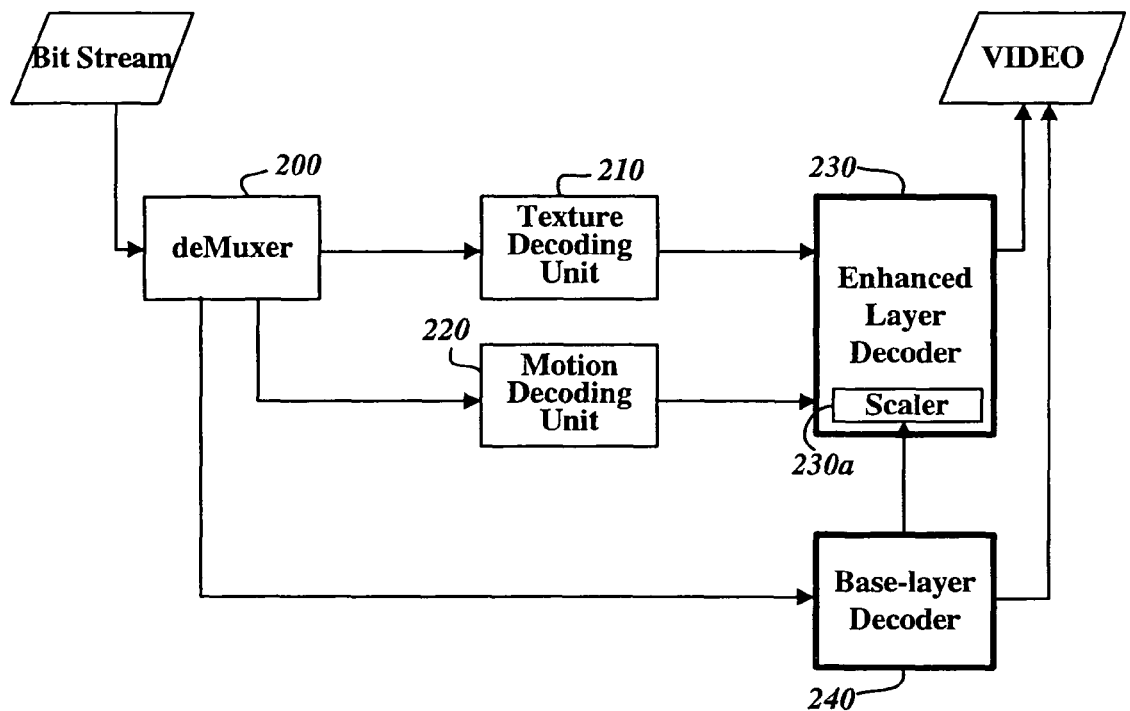
FIG. 8 is a block dim of an apparatus for decoding a data stream encoded by the apparatus of FIG. 1.

FIG. 8 is a block diagram of an apparatus for decoding a data steam encoded by the apparatus of FIG. 1a or 1b. The decoding apparatus of FIG. 8 includes a demuxer (or demultiplexer) 200, a texture decoding unit 210, a motion decoding unit 220, an EL decoder 230, and a base layer decoder 240. The demuxer 200 separates a received data stream into a compressed motion vector stream, a compressed macroblock information stream and a base layer stream. The texture decoding unit 210 reconstructs the compressed macroblock information stream to its original uncompressed state. The motion decoding unit 220 reconstructs the compressed motion vector stream to its original uncompressed state. The EL decoder 230 is an enhanced layer decoder which converts the uncompressed macroblock information stream and the uncompressed motion vector stream back to an original video signal, for example, according to an MCTF scheme. The base layer decoder 240 decodes the base layer stream according to a specified scheme, for example, according to the MPEG-4 or H.264 standard.

Figure 9:
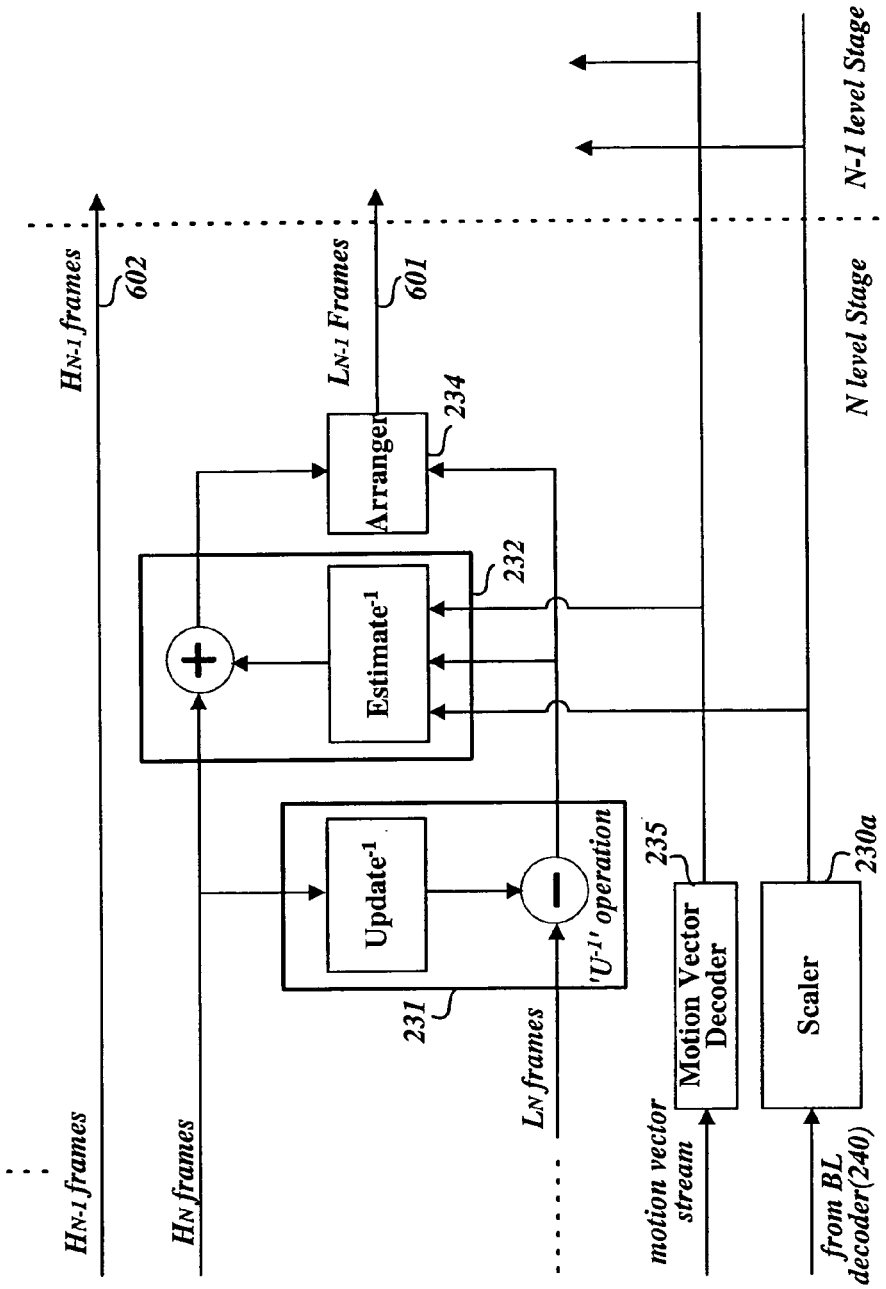
FIG. 9 is a block diagram part of an EL decoder shown in FIG. 8 responsible for carrying out inverse prediction and update operations.

The EL decoder 230 includes, as an internal element, an inverse filter that has a structure as shown in FIG. 9 for reconstructing an input stream to its original frame sequence.

FIG. 9 shows some elements of the inverse filter for reconstructing a sequence of H and L frames of MCTF level N to a sequence of L frames of level N−1. The elements of the inverse filter of FIG. 9 include an inverse updater 231, an inverse predictor 232, a motion vector decoder 235, an arranger 234, and a scaler 230a. The inverse updater 231 subtracts pixel difference values of input H frames from corresponding pixel values of input L frames. The inverse predictor 232 reconstructs input H frames to frames having original images with reference to the L frames, from which the image differences of the H frames have been subtracted, and/or with reference to enlarged pictures output from the scaler 240a. The motion vector decoder 235 decodes an input motion vector stream into motion vector information of each block and provides the motion vector information to an inverse predictor (for example, the inverse predictor 232) of each stage. The arranger 234 interleaves the frames completed by the inverse predictor 232 between the L frames output from the inverse updater 231, thereby producing a normal video frame sequence. The scaler 230a enlarges small-screen pictures of the base layer to the enhanced layer picture size, for example, according to the information as shown in FIGS. 5a and 5b.

The L frames output from the arranger 234 constitute an L frame sequence 601 of level N−1. A next-stage inverse updater and predictor of level N−1 reconstructs the L frame sequence 601 and an input H flame sequence 602 of level N−1 to an L frame sequence. This decoding process is performed the same number of times as the number of MCTF levels employed in the encoding procedure, thereby reconstructing an original video frame sequence. With reference to 'reference_selection_code' information carried in a header of each macroblock of an input H frame, the inverse predictor 232 specifies an L flame of the enhanced layer and/or an enlarged frame of the base layer which has been used as a reference frame to code the macroblock to residual data. The inverse predictor 232 determines a reference block in the specified frame based on a motion vector provided from the motion vector decoder 235, and then adds pixel values of the reference block (or average pixel values of two macroblocks used as reference blocks of the macroblock) to pixel difference values of the macroblock of the H frame; thereby reconstructing the original image of the macroblock of the H frame.

When a base layer picture has been used as a reference frame of a current H frame, the scaler 230a selects and enlarges an area in the base layer picture (in the example of FIG. 4) or enlarges a larger area than the base layer picture (in the example of FIG. 6) based on positional relationship information as shown in FIGS. 5a and 5b included in a header analyzed by the EL decoder 230 so that the enlarged area of the base layer picture is used for reconstructing macroblocks containing residual data in the current H frame to original image blocks as described above. The positional relationship information is extracted from the header and is then referred to when information indicating whether or not the positional relationship information is included (specifically, the flag "flag_base_layer_cropping" in the example of FIGS. 5a and 5b) indicates that the positional relationship information is included.

In the case where the information of FIGS. 5a and 5b has been used as information indicating the position of an area overlapping with an enhanced layer picture, to use in prediction of the enhanced layer picture, the inverse predictor 232 uses an enlarged one of the base layer picture received from the scaler 230a for prediction of the enhanced layer picture by associating the entirety of the enlarged base layer picture with all or part of the current H frame or with a larger area than the current H frame according to the values (positive or negative) of the offset information. In the case of FIG. 7 where the enlarged base layer picture is associated with a larger area than the current H frame, the predictor 232 uses only an area in the enlarged base layer picture, which corresponds to the H flame, for reconstructing macroblocks in the current H frame to their original images. In this example, the offset information included negative values.

For one H frame, the MCTF decoding is performed in specified units, for example, in units of slices in a parallel fashion, so that the macroblocks in the flame have their original images reconstructed and the reconstructed macroblocks are then combined to constitute a complete video flame.

The above decoding method reconstructs an MCTF-encoded data stream to a complete video frame sequence. The decoding apparatus decodes and outputs a base layer sequence or decodes and outputs an enhanced layer sequence using the base layer depending on its processing and presentation capabilities.

The decoding apparatus described above may be incorporated into a mobile communication terminal, a media player, or the like.

Returning to FIG. 1b, in addition to the discussion above, or alternative thereto, the downsampling unit 140 not only transmits the enhanced and base layer signals to the EL and BL encoders 100 and 150, but also transmits sampling-related information of the two layers to the EL and BL encoders 100 and 150. The sampling-related information of the two layers may include spatial resolution (or screen sizes), frame rates, the ratios between luma and chroma signals of the two layers, the positions of chroma signals of the two layers, and information regarding a phase shift between luma and chroma signals of the two layers based on the respective positions of the luma and chroma signals of the two layers.

The phase shift can be defined as the phase difference between luma signals of the two layers. Typically, luma and chroma signals of the two layers are sampled so as to satisfy a position condition according to the ratio between the luma and chroma signals, and the luma signals of the two layers are sampled so as to be in phase with each other.

The phase shift can also be defined as the phase difference between chroma signals of the two layers. The phase difference between chroma signals of the two layers can be determined based on the difference between positions of the chroma signals of the two layers after the positions of the luma signals of the two layers are matched to each other so that the luma signals of the two layers are in phase with each other.

The phase shift can also be individually defined for each layer, for example, with reference to a single virtual layer (e.g., an upsampled base layer) based on the input video signal for generating the enhanced or base layer. Here, the phase difference is between luma and/or chroma samples (i.e., pixels) of the enhanced layer of the base layer and the virtual layer (e.g., an upsampled base layer).

The EL encoder 100 records the phase shift information transmitted from the downsampling unit 140 in a header area of a sequence layer or a slice layer. If the phase shift information has a value other than 0, the EL encoder 100 sets a global shift flag "global_shift_flag", which indicates whether or not there is a phase shift between the two layers, to, for example, "1", and records the value of the phase shift in information in fields "global_shift_x" and "global_shift_y". The "global_shift_x" value represents the horizontal phase shift. The "global_shift_y" value represents the vertical phase shift Stated another way, the "global_shift_x" value represents the horizontal position offset between the samples (i.e., pixels), and the "global_shift_y" represents the vertical position offset between the samples (i.e., pixels).

On the other hand, if the phase shift information has a value of 0, the EL encoder 100 sets the flag "global_shift_flag" to, for example, "0", and does not record the values of the phase shift in the information fields "global_shift_x" and "global_shift_y".

The EL encoder 100 also records the sampling-related information in the header area of the sequence layer or the slice layer if needed.

It will be recalled from the discussion of FIG. 2 that the EL encoder 100 may also include a BL decoder 105. The BL decoder 105 extracts encoding information such as a macroblock mode from an encoded base layer stream containing a small-screen sequence received from the BL encoder 150, and decodes the encoded base layer stream to produce frames, each composed of one or more macroblocks. It will also be recalled that the estimator/predictor 102 can also search for a reference block of the macroblock in a frame of the base layer according to the intra BL prediction method. Specifically, the estimator/predictor 102 searches for a corresponding block encoded in an intra mode in a frame of the base layer reconstructed by the BL decoder 105, which is temporally coincident with the frame including the macroblock. As will be recalled, the term "corresponding block" refers to, for example, a block which is located in the temporally coincident base layer frame and which would have an area covering the macroblock if the base layer frame were enlarged by the ratio of the screen size of the enhanced layer to the screen size of the base layer.

The estimator/predictor 102 reconstructs an original image of the found corresponding block by decoding the intra-coded pixel values of the corresponding block and then upsamples the found corresponding block to enlarge it by the ratio of the screen size of the enhanced layer to the screen size of the base layer. The estimator/predictor 102 performs this upsampling taking into account the phase shift information "global_shift_x/y" transmitted from the downsampling unit 140 so that the enlarged corresponding block of the base layer is in phase with the macroblock of the enhanced layer.

The estimator/predictor 102 encodes the macroblock with reference to a corresponding area in the corresponding block of the base layer, which has been enlarged so as to be in phase with the macroblock. Here, the term "corresponding area" refers to a partial area in the corresponding block which is at the same relative position in the frame as the macroblock.

If needed, the estimator/predictor 102 searches for a reference area more highly correlated with the macroblock in the enlarged corresponding block of the base layer by performing motion estimation on the macroblock while changing the phase of the corresponding block, and encodes the macroblock using the found reference area.

If the phase of the enlarged corresponding block is further changed while the reference area is searched for, the estimator/predictor 102 sets a local shift flag "local_shift_flag", which indicates whether or not there is a phase shift, different from the global phase shift "global_shift_x/y", between the macroblock and the corresponding upsampled block, to, for example, "1". Also, the estimator/predictor 102 records the local shift flag in a header area of the macroblock and records the local phase shift between the macroblock and the corresponding block in information fields "local_shift_x" and "local_shift_y". The local phase shift information may be replacement information, and provide the entire phase shift information as a replacement or substitute for the global phase shift information. Alternatively, the local phase shift information may be additive information, wherein the local phase shift information added to the corresponding global phase shift information provides the entire or total phase shift information.

The estimator/predictor 102 further inserts information indicating that the macroblock of the enhanced layer has been encoded in an intra BL mode in the header area of the macroblock so as to inform the decoder of the same.

The estimator/predictor 102 can also apply the inter-layer residual prediction method to a macroblock to contain residual data, which is data of an image difference, using a reference block found in other frames prior to and subsequent to the macroblock. Also in this case, the estimator/predictor 102 upsamples a corresponding block of the base layer encoded so as to contain residual data, which is data of an image difference, taking into account the phase shift information "global_shift_x/y" transmitted from the downsampling unit 140 so that the base layer is in phase with the enhanced layer. Here, the corresponding block of the base layer is a block which has been encoded so as to contain residual data, which is data of an image difference.

The estimator/predictor 102 inserts information indicating that the macroblock of the enhanced layer has been encoded according to the inter-layer residual prediction method in the header area of the macroblock so as to inform the decoder of the same.

The estimator/predictor 102 performs the above procedure for all macroblocks in the frame to complete an H frame which is a predictive image of the frame. The estimator/predictor 102 performs the above procedure for all input video frames or all odd ones of the L frames obtained at the previous level to complete H frames which are predictive images of the input frames.

As described above, the updater 103 adds an image difference of each macroblock in an H frame produced by the estimator/predictor 102 to an L frame having its reference block, which is an input video frame or an even one of the L frames obtained at the previous level.

The data stream encoded in the method described above is transmitted by wire or wirelessly to a decoding apparatus or is delivered via recording media. The decoding apparatus reconstructs the original video signal according to the method described below.

Figure 10:
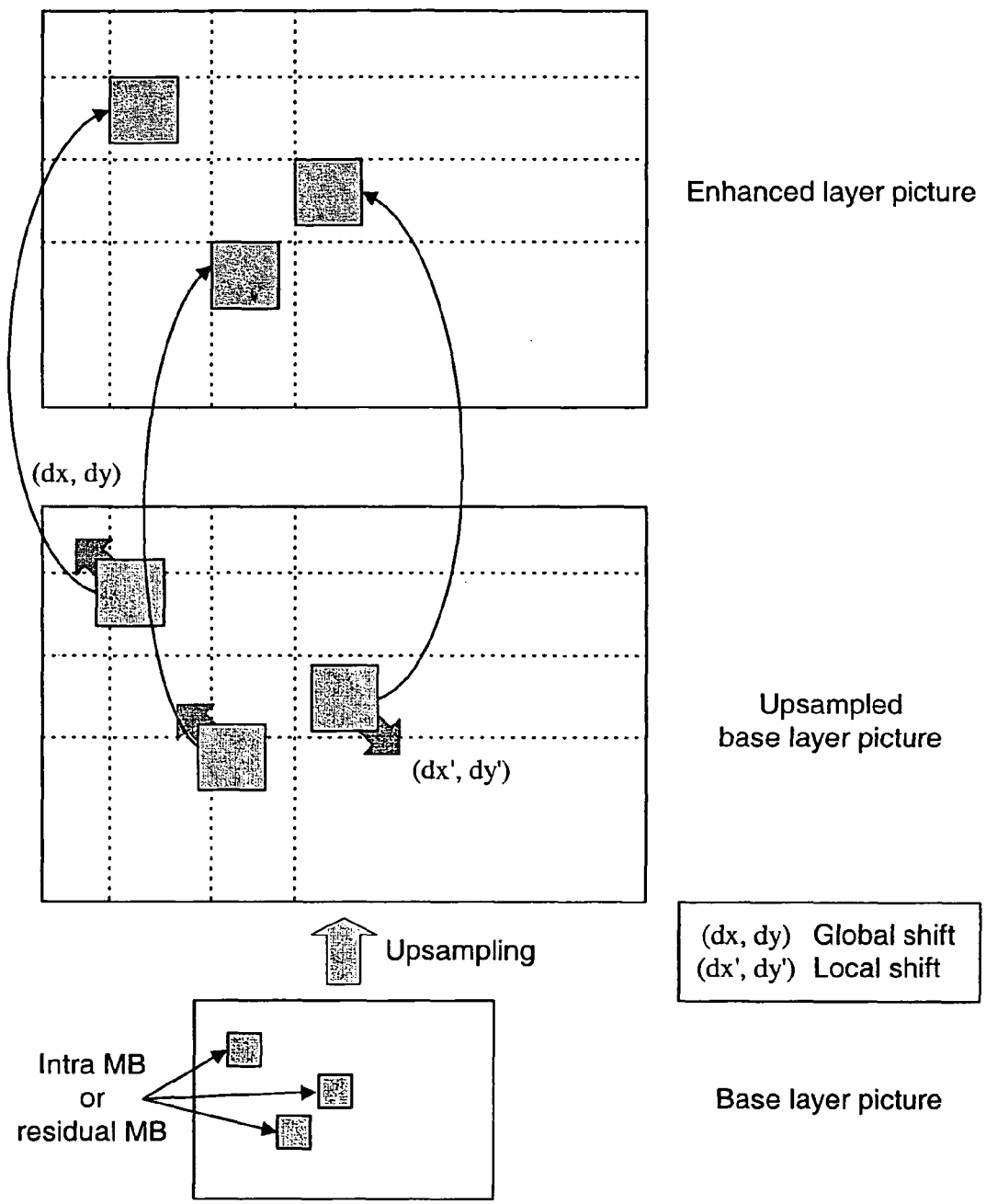
FIG. 10 illustrates a method for upsampling a base layer for use in decoding an enhanced layer, encoded according to an inter-layer prediction method, taking into account a phase shift in the base layer and/or the enhanced layer, according to an embodiment of the present invention.
Figure 11:
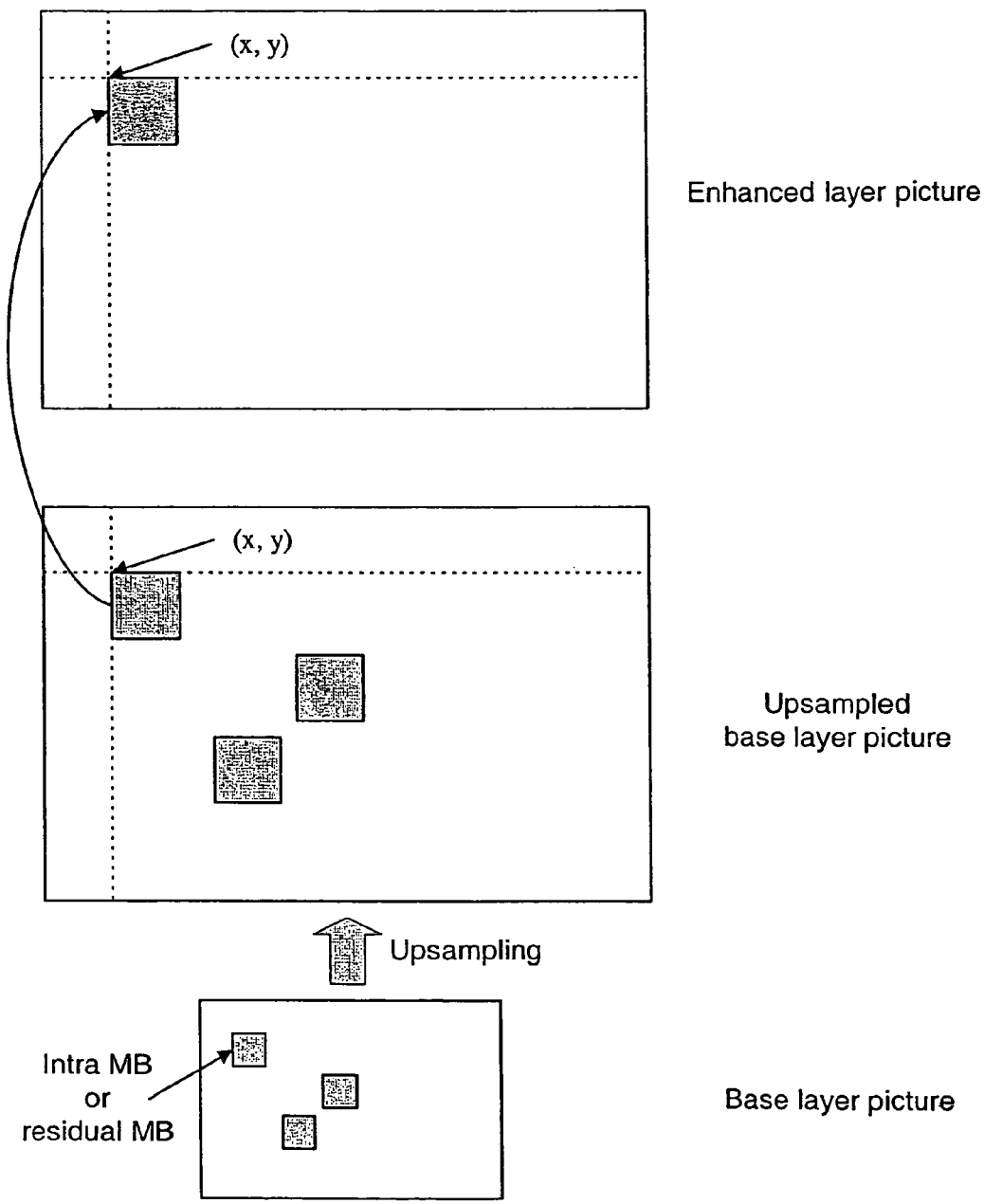
FIG. 11 illustrates an example of an inter-layer prediction method for encoding an enhanced layer using a base layer according to conventional alt.
Figure 12:
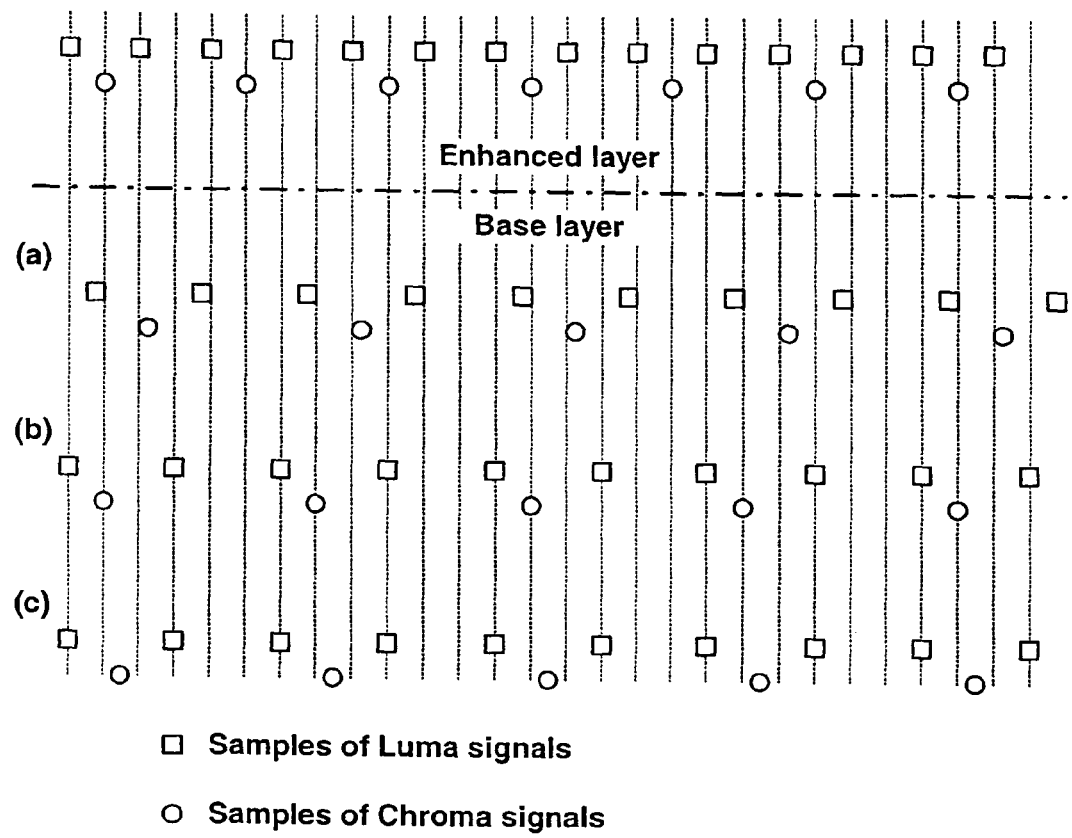
FIG. 12 illustrates examples of phase relationships between enhanced and base layers according to conventional art.

FIG. 10 illustrates a method for upsampling a base layer for use in decoding an enhanced layer, encoded according to the inter-layer prediction method, taking into account a phase shift in the base layer and/or the enhanced layer, according to an embodiment of the present invention.

In order to decode a macroblock of the enhanced layer encoded according to the inter-layer prediction method, a block of the base layer corresponding to the macroblock is enlarged by the ratio of the screen size of the enhanced layer to the screen size of the base layer through upsampling. This upsampling is performed taking into account phase shift information "global_shift_x/y" in the enhanced layer and/or the base layer, so as to compensate for a global phase shift between the macroblock of the enhanced layer and the enlarged corresponding block of the base layer.

If there is a local phase shift "local_shift_x/y", different from the global phase shift "global_shift_x/y", between the macroblock of the enhanced layer and the corresponding block of the base layer, the corresponding block is upsampled taking into account the local phase shift "local_shift_x/y". For example, the local phase shift information may be used instead of the global phase shift information in one embodiment, or alternatively, in addition to the global phase shift information in another embodiment.

Then, an original image of the macroblock of the enhanced layer is reconstructed using the corresponding block which has been enlarged so as to be in phase with the macroblock.

Returning to FIGS. 8 and 9, decoding of macroblocks based on the above-described phase shift information will now be described. Only the differences from the description of decoding provided above with respect to FIGS. 8 and 9 will be described in detail for the sake of brevity. In this embodiment, the EL decoder 230 uses encoding information of the base layer and/or a decoded frame or macroblock of the base layer in order to decode an enhanced layer stream according to the inter-layer prediction method. To accomplish this, the EL decoder 230 reads a global shift flag "global_shift_flag" and phase shift information "global_shift_x/y" from a sequence header area or a slice header area of the enhanced layer to determine whether or not there is a phase shift in the enhanced layer and/or the base layer and to confirm the phase shift. The EL decoder 230 upsamples the base layer taking into account the confirmed phase shift so that the base layer to be used for the inter-layer prediction method is in phase with the enhanced layer.

More specifically, with reference to FIG. 9, the inverse predictor 232 reconstructs an original image of an intra-coded block in the base layer, which corresponds to the macroblock in the enhanced layer, and upsamples the reconstructed corresponding block from the base layer to enlarge it by the ratio of the screen size of the enhanced layer to the screen size of the base layer. The inverse predictor 232 performs this upsampling taking into account phase shift information "global_shift_x/y" in the enhanced layer and/or the base layer so that the enlarged corresponding block of the base layer is in phase with the macroblock of the enhanced layer. Namely, if the "global_shift_flag" indicates a phase shift exists between the base layer and the enhanced layer (e.g., equals 1), then the inverse predictor 232 phase shifts the corresponding macroblock from the base layer during upsampling by the "global_shift_x" and "global_shift_y" values. The inverse predictor 232 reconstructs an original image of the macroblock by adding pixel values of a corresponding area in the enlarged corresponding block of the base layer, which has been enlarged so as to be in phase with the macroblock, to the difference values of pixels of the macroblock. Here, the term "corresponding area" refers to a partial area in the corresponding block which is at the same relative position in the frame as the macroblock.

If a local shift flag "local_shift_flag" indicates that there is a local phase shift "local_shift_x/y" different from the global phase shift "global_shift_x/y" between the macroblock and the corresponding block, the inverse predictor 232 upsamples the corresponding block taking into account the local phase shift "local_shift_x/y" (as substitute or additional phase shift information). The local phase shift information may be included in the header area of the macroblock.

If information indicating that a macroblock in an H frame has been encoded in an inter-layer residual mode is included in a header area of the macroblock, the inverse predictor 232 upsamples a corresponding block of the base layer encoded so as to contain residual data, taking into account the global phase shift "global_shift_x/y" as discussed above to enlarge the corresponding block so as to be in phase with the macroblock of the enhanced layer. The inverse predictor 232 then reconstructs residual data of the macroblock using the corresponding block enlarged so as to be in phase with the macroblock.

The inverse predictor 232 searches for a reference block of the reconstructed macroblock containing residual data in an L frame with reference to a motion vector provided from the motion vector decoder 233, and reconstructs an original image of the macroblock by adding pixel values of the reference block to difference values of pixels (i.e., residual data) of the macroblock.

All macroblocks in the current H frame are reconstructed to their original images in the same manner as the above operation, and the reconstructed macroblocks are combined to reconstruct the current H frame to an L frame. The arranger 234 alternately arranges L frames reconstructed by the inverse predictor 232 and L frames updated by the inverse updater 231, and outputs such arranged L frames to the next stage.

The above decoding method reconstructs an MCTF-encoded data stream to a complete video frame sequence. In the case where the prediction and update operations have been performed for a group of pictures (GOP) N times in the MCTF encoding procedure described above, a video frame sequence with the original image quality is obtained if the inverse update and prediction operations are performed N times in the MCTF decoding procedure. However, a video frame sequence with a lower image quality and at a lower bitrate may be obtained if the inverse update and prediction operations are performed less than N times. Accordingly, the decoding apparatus is designed to perform inverse update and prediction operations to the extent suitable for the performance thereof.

The decoding apparatus described above can be incorporated into a mobile communication terminal, a media player, or the like.

As is apparent from the above description, a method and apparatus for encoding/decoding a video signal according to the present invention uses pictures of a base layer provided for low-performance decoders, in addition to pictures of an enhanced layer, when encoding a video signal in a scalable fashion, so that the total amount of coded data is reduced, thereby increasing coding efficiency. In addition, part of a base layer picture, which can be used for a prediction operation of an enhanced layer picture, is specified so that the prediction operation can be performed normally without performance degradation even when a picture enlarged from the base layer picture cannot be directly used for the prediction operation of the enhanced layer picture.

As is apparent from the above description, a method for encoding and decoding a video signal according to the present invention increases coding efficiency by preventing a phase shift in a base layer and/or an enhanced layer caused in downsampling and upsampling procedures when encoding/decoding the video signal according to an inter-layer prediction method.

Furthermore, as will be apparent from the descriptions provided above, the encoding and decoding embodiments related to phase shift information may be used independently or in conjunction with the encoding and decoding embodiments related to offset information.

Although the example embodiments of the present invention have been disclosed for illustrative purposes, those skilled in the art will appreciate that various improvements, modifications, substitutions, and additions are possible, without departing from the scope and spirit of the invention.

What is claimed is:

1. A method for decoding a video signal, comprising:
    decoding a base layer image in a base layer;
    obtaining first phase shift information between a luma sample and a chroma sample in an enhanced layer;
    determining whether second phase shift information between a luma sample and a chroma sample in the base layer is transmitted;
    obtaining the second phase shift information in the base layer according to the determining step;
    obtaining offset information indicating a position difference between at least one boundary pixel of an up-sampled image and at least one boundary pixel of a current image in the enhanced layer for an inter-layer prediction between the base layer and the enhanced layer, wherein the enhanced layer differs from the base layer in an aspect ratio or a spatial resolution, the up-sampled image representing an up-sampled base layer image;
    performing motion prediction to decode an inter-coded block of the current image in the enhanced layer using a motion vector of the base layer; and performing texture prediction to decode an intra-coded block of the current image in the enhanced layer based on the base layer image, the performing texture prediction comprising:
(1) obtaining reference pixel values in the base layer based on the first phase shift information, the second phase shift information and the offset information; and
(2) decoding the intra-coded block in the enhanced layer based on the reference pixel values.

2. The method of claim 1, wherein the base layer is from a same video signal of the enhanced layer.

3. The method of claim 1, wherein the second phase shift information and the offset information are obtained from sequence parameter set in the enhanced layer.

4. The method of claim 1, wherein the second phase shift information and the offset information are obtained from a slice header in the enhanced layer.

5. The method of claim 1, wherein the offset information includes
left offset information indicating a position offset between at least one left side pixel of the up-sampled image and at least one left side pixel of the current image,
top offset information indicating a position offset between at least one top side pixel of the up-sampled image and at least one top side pixel of the current image,
right offset information indicating a position offset between at least one right side pixel of the up-sampled image and at least one right side pixel of the current image,
bottom offset information indicating a position offset between at least one bottom side pixel of the up-sampled image and at least one bottom side pixel of the current image.

6. The method of claim 1, wherein the determining step further comprising:
determining whether the offset information is transmitted through one of sequence parameter set and a slice header in the enhanced layer,
wherein the offset information is obtained based on the determining step.

7. The method of claim 1, wherein the reference pixel values are obtained based on dimension information, the dimension information indicating at least one dimension of the current image.

8. The method of claim 7, wherein the dimension information includes width information indicating a width of the current image and height information indicating a height of the current image.

9. An apparatus for decoding a video signal, comprising:
a base layer decoder configured to decode a base layer image in a base layer;
a demuxer configured to obtain first phase shift information between a luma sample and a chroma sample in an enhanced layer,
determine whether second phase shift information between a luma sample and a chroma sample in the base layer is transmitted,
obtain the second phase shift information in the base layer according to the determination,
obtain offset information indicating a position difference between at least one boundary pixel of an up-sampled image and at least one boundary pixel of a current image in the enhanced layer for an inter-layer prediction between the base layer and the enhanced layer, wherein the enhanced layer differs from the base layer in an aspect ratio or a spatial resolution, the up-sampled image representing an up-sampled base layer imaged;
a motion decoding unit configured to perform motion prediction to decode an inter-coded block of the current image in the enhanced layer using a motion vector of the base layer; and
a texture decoding unit configured to obtain reference pixel values in the base layer based on the first phase shift information, the second phase shift information and the offset information, and
decode an intra-coded block of the current image in the enhanced layer based on the reference pixel values.

10. The method of claim 1, wherein the performing texture prediction further comprising:
determining whether a position of the intra-coded block in the enhanced layer is included in the up-sampled image.

11. The apparatus of claim 9, wherein the texture decoding unit is configured to determine whether a position of the intra-coded block in the enhanced layer is included in the up-sampled image.

* * * * *